INVENTOR.
JACQUES I. PANKOVE

W.S. Hill
AGENT

United States Patent Office 3,412,344
Patented Nov. 19, 1968

3,412,344
SEMICONDUCTOR PLASMA LASER
Jacques I. Pankove, Princeton, N.J., assignor to Radio
Corporation of America, a corporation of Delaware
Filed Oct. 30, 1963, Ser. No. 320,100
8 Claims. (Cl. 331—94.5)

ABSTRACT OF THE DISCLOSURE

A laser comprises a body of semiconductor material having a first portion that exhibits impact ionization and radiative recombination of ionized particles produced by the impact ionization. The first portion comprises substantially intrinsic semiconductor material. The body also includes a second portion of semiconductor material with a higher conductivity and a larger optical energy bandgap than the first portion. The second portion functions as a part of the means for producing impact ionization, means for resonating the radiation, and means for transmitting the radiation out of the body.

---

This invention relates to a device for generating coherent radiation, and particularly to such a device in which the coherent radiation results from impact ionization in a semiconductor body.

Devices for generating coherent radiation in a solid have been described previously. In such devices, which are also referred to as lasers or optical masers, a population inversion of charge carriers in a solid is achieved either by irradiating the solid with noncoherent light to generate electron-hole pairs, or by introducing electrons and holes in substantially equal proportions into the body from an external source, as by injection at a p-n junction. Achieving a population inversion is referred to as pumping. Coherent radiation is obtained when a suitable light flux stimulates electrons and holes to recombine in the body through particular radiative energy transitions. The coherent radiation is then allowed to escape through the sides of the body, which are transparent to this radiation.

Devices in which ionziation is produced in a semiconductor body by applying an electric field thereto have been described previously; for example, by M.C. Steele in U.S. Patent 3,042,853. In such devices, an electric field applied to a deionized semiconductor accelerates the few available free carriers present therein. When the accelerated carriers collide with atoms in the body, the atoms become ionized creating a plasma of electron-hole pairs. This phenomenon is sometimes referred to as impact ionization. The ionized electrons and holes may recombine radiatively in the body, producing noncoherent light.

A laser comprised of a semiconductor body which is pumped by impact ionization has many practical difficulties. In order to provide the required light flux for stimulating emission, it is necessary (1) for the light to travel in a long path substantially parallel to the applied electric field, and (2) that there be a relatively high density of electron-hole pairs in the body. If a conventional laser structure is used, the mirrors of the light resonator for imparting a long light path length interfere with the electrodes for applying the electric field, which must also be capable of carrying heavy current, because the two structures are located at the same place with respect to the location of the light path in the body. In addition, since the radiation travels in a path parallel to the electric field, the electrodes interfere with the tranmission of the coherent radiation out of the body.

An object of this invention is to provide a novel coherent radiation generator.

Another object is to provide a device for generating coherent light by impact ionization in a semiconductor body.

A further object is to provide an impact ionization device for generating coherent radiation including novel means for transmitting light out of the body.

In general, the device of the invention comprises a body of semiconductor material of the type which exhibits impact ionization therein under predetermined conditions of applied electric field, and also exhibits radiative recombination of ionized particles produced by the impact ionization. There are provided means for causing the recombination radiation to resonate in the body, means for producing a plasma by impact ionization in the body of sufficient magnitude to produce resonating coherent radiation in the body, and means for transmitting the coherent radiation out of the body.

One feature of the invention is the combination of means for producing impact ionization in the body and means for transmitting the coherent radiation out of the body. The two means have a common structure which can function both as an electrode and as a radiation transmitter. In one embodiment, the semiconductor body is in two portions, both portions composed of a semiconductor of the type which exhibits a net increase in the optical bandgap when it is doped to degeneracy; for example, indium antimonide. The optical bandgap is the threshold energy of the propagating radiation at which the material becomes opaque. The material is transmitting at energies lower than the optical bandgap. One portion for impact ionization is substantially undoped and is highly resistive, and the other portion which acts as an electrode and transmits coherent radiation is doped to increase the optical bandgap thereof. In another embodiment, the semiconductor body is in two portions, each composed of a different compound semiconductor with different bandgaps. but having either a common cation or a common anion; for example indium arsenide and gallium arsenide, or indium arsenide and indium antimonide. The portion with the smaller bandgap, which is for impact ionization, is substantially undoped and is highly resistive; and the other portion with the larger optical bandgap is highly doped and is conductive, and acts as an electrode and also transmits coherent radiation.

A more detailed description of the invention and illustrative embodiments thereof appear below in conjunction with the drawing in which.

Similar reference numerals are used for similar structures throughout the drawing.

Figure 1:
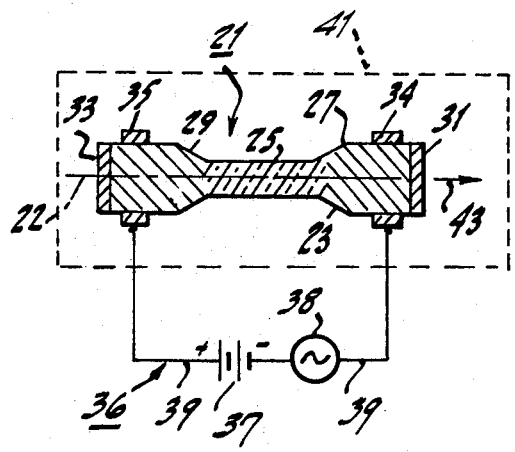
FIGURE 1 is a first embodiment of the invention which includes a pair of electrodes composed of the same semiconductor as the impact ionization portion of the device, but is doped to degeneracy to provide a broader optical bandgap therein.

FIGURE 1 shows a device 21 including a single crystal body 23 of semiconductor material. The body 23 is made up of a center portion 25 and a right end portion 27 and a left end portion 29 as viewed in FIGURE 1. The portions are aligned along a common axis or path 22.

The semiconductor material of the center portion 25 exhibits, under predetermined conditions of temperature and applied electric field, ionization of atoms constituting the material. The phenomenon is also called impact ionization and, as is known in the art, prior to the application of the electric field, the body is substantially deionized at the operating temperature of the device. The center portion may be intrinsic or may be doped, and is characterized by exhibiting a high resistance in its deionized condition and a low resistance when ionized either by the application of heat or of an electric field thereto. The material of the center portion 25 is also characterized by exhibiting radiative recombination of charge carriers across the bandgap of the semiconductor or through states in the bandgap after the material is ionized by an electric field.

The semiconductor material of the right end portion 27 is doped with conductivity-type-determining impurities to degeneracy or near degeneracy. This doping has the effect of modifying the semiconductor in two important respects. It makes the portion 27 electrically-conducting at low temperatures, and it broadens the optical energy bandgap of the semiconductor so that the right end portion can transmit a broader band of frequencies of radiation than the center portion 25. This phenomenon is observed with semiconductors in which the effective mass of at least one type of free carrier is relatively small.

The semiconductor material of the left end portion 29 is doped to impart the same properties as the right end portion 27, although it may be doped with different impurities and to a different degree. The end regions 27 and 29 function as electrodes for applying an electric field across the center portion 25 in a direction substantially parallel to the axis 22. The end regions 27 and 29 are preferably of greater cross section than the center portion 25 in order to reduce the current density in the end portions 27 and 29.

One suitable semiconductor material for the device of FIGURE 1 is indium antimonide. The center portion is pure intrinsic material, and the end portions are of indium antimonide made degenerate N-type by doping with about $10^{19}$ atoms/cc. of a donor such as tin or tellurium. Another suitable semiconductor material is indium arsenide, which may also be doped with tin or tellurium.

The outer opposed end surfaces of the end regions 27 and 29 are preferably plane parallel surfaces which may be obtained for example by cleavage of the body along the cleavage planes of the crystal. Plane parallel surfaces may also be produced by grinding and polishing the surfaces. A pair of plane parallel mirrors 31 and 33 are placed adjacent the outer opposed end surfaces of the body 23 and form a Fabry Perrot resonator for reflecting the radiation produced in the body 23 along paths parallel to the axis 22. Preferably, the mirrors are formed directly upon the end surfaces of the body 23. Alternatively, the mirrors 31 and 33 may be spaced from the end surfaces of the body 23. In order to provide plane parallel surfaces, it may be convenient to select the crystallographic orientation of the crystal with the axis 22 coinciding with either the [111] or [100] axis of the crystal so that the end surfaces may be produced by cleavage. The mirror 33 at the left end may be entirely reflecting. The mirror 31 at the right end is partially reflecting and partially transmitting, usually transmitting of the order of 5% of the radiation incident thereon.

A right contact 34 comprising a metal ring completely encircling the right end portion 27 provides an ohmic electric connection to the right end portion 27. A left contact 35 comprising a metal ring completely encircling the left end portion 29 provides an ohmic electric connection to the left end portion 29. A circuit 36 for operating the device 21 comprises a bias voltage source 37 and a signal voltage source 38 connected in series to the contacts 34 and 35 through the leads 39. The circuit 36 may apply a constant bias voltage and a superimposed alternating, or pulsed or intermittent noncyclical voltage. The voltage sources 37 and 38 may be combined into a single source which provides both the bias and the signal voltages.

In operation, the body 23 is cooled to temperatures at which the center portion 25 is substantially deionized. Such cooling may be achieved by placing the body 23 in a cryostat (indicated by the dotted rectangle 41) or other device for this purpose with a bias voltage applied, a voltage pulse from the signal source 38 is applied across the contacts 34 and 35. The combination of voltages produces an electric field across the center portion 25 which produces a plasma in the center portion and also generates recombination radiation.

The electric field necessary for producing a plasma is determined by the bandgap and the impurities in the semiconductor. For pure indium antimonide, the threshold field is about 150 volts/cm. The presence of impurities may lower the threshold field. Semiconductors with larger bandgaps have higher threshold fields; but, again the presence of impurities in the semiconductor may lower the threshold field. In operation, the bias voltage produces a field less than the threshold field. The signal voltage produces a field which, in addition to the field produced by the bias voltage, exceeds the threshold field.

The recombination of charge carriers preferably occurs by band-to-band transistions of carriers across the energy bandgap of the semiconductor. Alternatively, radiative recombination may occur by transistions of carriers through states in the bandgap which have been produced by the introduction of impurities or by other methods known in the art. Often, the recombination via states in the bandgap is a monomolecular process (the radiation intensity is proportional to the current) and involves a spread of levels resulting in a fairly broad emission spectrum. Hence from line width and efficiency considerations, this mode of operation is not preferred. However, some recombination levels are very narrowly distributed in energy (discrete) and result in a very narrow emission spectrum. Such is the case of recombination at shallow impuritiy levels and of the recombination of excitons.

Band-to-band recombination is triggered by some of the photons present in the material. In any material, there are thermal photons whose density and spectrum are determined by the temperature of the material (according to Planck's law) and zero point photons which correspond to the minimum energy of the system (at absolute zero temperature). The zero point photons cannot be absorbed, but they can trigger the recombination process. The zero point photons are the dominant modes. In germanium, for example, there are $1.7 \times 10^{13}$ zero point photons per cubic centimeter (cc.) at the gap energy within a spectral band 1000 A. wide, while there are only 42 thermal photons per cc. in that same band at room temperature. The zero point photons occur at random phases and therefore induce noncoherent emission. However, if the recombination rate is sufficiently high, the photons created by radiative recombination are denser than the zero point photons. In this case, the recombination becomes self-triggering. Then, the spectrum sharpens up and the radiation becomes coherent.

The calculated minimum value for critical density required for laser action using band-to-band recombination for a number of materials is shown in Table I.

Table I.—*Minimum critical carrier pair concentration per cc. at 4.2° K. for laser action*

Germanium _____ $1.4 \times 10^{17}$ pairs per cm.$^3$.
Silicon _____ $3.1 \times 10^{17}$.
Gallium arsenide _____ $4. \times 10^{15}$.
Gallium phosphide _____ $4.2 \times 10^{15}$.
Gallium antimonide _____ $5.7 \times 10^{15}$.
Indium antimonide _____ $10^{14}$.

The radiation in the body 23 that travels parallel to the axis 22 is reflected many times by the mirrors 31 and 33 building up the amplitude of the radiant flux, causing stimulated emission of the recombination radiation. Such stimulation produces coherent radiation, a portion of which may be observed and utilized as a beam 43 transmitted out of the body through the partially transmitting mirror 31. The end portions 27 and 29 of the body 23, not only function as electrodes for applying a voltage across the center portion 25, but also provide a path for the resonating radiation between the center portion 25 and the mirrors 31 and 33.

Figure 2:
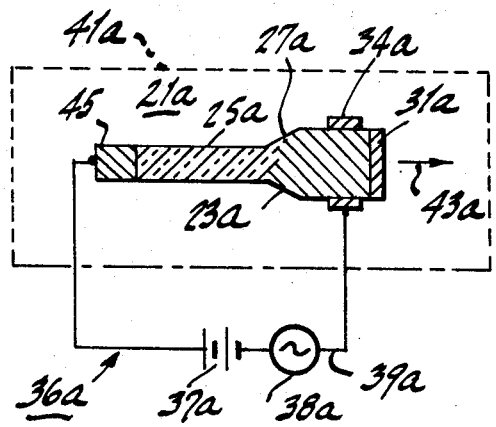
FIGURE 2 is a second embodiment of the invention which includes one electrode composed of a different broader bandgap semiconductor than the impact ionization portion of the device, and another electrode composed of a metal.

FIGURE 2 illustrates a device 21a including a single crystal body 23a of semiconductor material made up of a center portion 25a and a right end portion 27a, which are functionally the same as the corresponding portions 25 and 27 of the device of FIGURE 1. The center and right portions 25a and 27a are constituted of different semiconductor materials but have either a common cation or a common anion. The materials are selected so that the center portion 25a has a smaller energy bandgap than the material of the right end portion 27a. For example, the center portion 25a may be of gallium arsenide and the right end portion 27a may be of gallium phosphide; or the center portion 25a may be of indium antimonide and the right end portion 27a may be of gallium antimonide or indium arsenide. The center and right end portions 25a and 27a are in the same crystal lattice and may be produced epitaxially. In addition to pure compounds, alloys of compounds may also be used.

The functions of the left end portion 29, the left mirror 33 and the left contact 35 of the device 21 of FIGURE 1 are combined into a single structure 45 in the device 21a of FIGURE 2. The structure 45 is a metal portion connected to the plane parallel end surface of the center region 25a. The interface between structure 45 and the center region 25a makes an ohmic electrical connection therebetween and also constitutes the totally reflecting mirror of the resonator for the device. The device of FIGURE 2 is otherwise the same as the device of FIGURE 1 both structurally and functionally.

By way of example, and referring to FIGURE 1, the body 21 may be cut from a crystal of InSb having two epitaxially grown ends of InSb doped with about $10^{19}$ Te atoms/cm.$^3$. The crystal is cut into wafers about 1 mm. thick. The tellurium doped ends are cleaved to produce plane parallel facets. Then, a constricted center portion 25 is cut out, as by etching or by means of an ultrasonic cutter. The constricted center portion 25 is about 1 mm. by 1 mm. thick and about 1.5 cm. long. The cleaved end portions 27 and 29 are metallized with layers 31 and 33 of silver, the thickness of which is adjusted to give a 5% transmission of radiation. Contacts 34 and 35 are then soldered to the degenerately doped end portions 27 and 29 of the device. A circuit 36 is connected to the device as illustrated in FIGURE 1. The device may be immersed in a refrigerant or mounted on a sapphire pedestal in contact with a bath of refrigerant (such as liquid He). A one microsecond pulse of 250 volts amplitude is applied to the device to produce sufficient field for impact ionization, which in turn generates coherent radiation at about 0.23 ev. (about 5350 A.).

What is claimed is:

1. A device for generating coherent radiation by impact ionization comprising
    a body of semiconductor material having a substantially intrinsic region,
    means for producing an electric field in said region in a given direction and of an intensity to produce impact ionization therein,
    means for maintaining said body at a temperature such that, in the absence of said electric field, said body is substantially deionized,
    means for establishing a resonant optical cavity in said body for light flux along said given direction,
    said region having sufficient length in said given direction that carriers are accelerated by said electric field within said region and generate therein a plasma of ionized electron-hole pairs having sufficient density to produce resonant light flux in said optical cavity along said given direction, said resonant light flux being produced by stimulated radiative recombinations of said ionized electrons and holes, and
    means for transmitting said light flux out of said body through one of said electrodes including a portion of semiconductor material, integral with said region, and comprising at least an anion or a cation in common with said region.

2. A device for generating coherent radiation by impact ionization as described in claim 1 wherein
    said temperature is that at which impact ionization occurs within said region when said electric field is produced therein,
    said means for producing an electric field includes a pair of electrodes, and
    said portion of semiconductor material is the same as that of said region but is relatively much more heavily doped.

3. A device for generating coherent radiation by impact ionization as described in claim 1, wherein
    said portion of semiconductor material is located along said given direction, and the semiconductor material of said portion is the same as that of said region and has a greater electrical conductivity and a larger optical energy band gap than the semiconductor material of said region.

4. A device for generating coherent radiation by impact ionization as described in claim 1 wherein
    a second portion of semiconductor material is on a side opposite to that of said first-mentioned portion and is located along said given direction, said semiconductor materials of said portions being the same as that of said region and each having a greater electrical conductivity and a larger optical energy band gap than the semiconductor material of said region.

5. A device for generating coherent radiation by impact ionization as described in claim 1, wherein
    said portion of semiconductor material is located along said given direction, the semiconductor material of said portion is of the same semiconductor material of said region but contains conductivity type determining impurities in such high proportions as to impart thereto a greater electrical conductivity and a larger optical energy band gap than the semiconductor material of said region.

6. A device for generating coherent radiation by impact ionization comprising
    a body of semiconductor material having a substantially intrinsic region,
    means for producing an electric field in said region in a given direction and of an intensity to produce impact ionization therein,
    means for maintaining said body at a temperature such that, in the absence of an applied electric field, said region is substantially deionized,
    means for establishing a resonant optical cavity for light flux substantially parallel to said given direction,
    said region having sufficient length along a path in said given direction that carriers are accelerated by said electric field within said region and generate therein a plasma of ionized electron-hole pairs having sufficient density to generate said coherent radiation within said cavity along said given direction, said coherent radiation being produced by stimulated radiative recombinations of said ionized electrons and holes, and
    means for transmitting said coherent radiation out of said body including a portion of said body of semiconductor material, integral with said region, and located along said given direction, the semi-conductor material of said portion being of a different semiconductor material than that of said region, but having an anion or a cation in common with said region and having a greater electrical conductivity and a larger optical energy band gap than the semiconductor material of said region.

7. A device for generating coherent radiation as described in claim 1, wherein
said means for establishing a resonant optical cavity in said body includes a pair of plane parallel mirrors positioned on opposite sides of said body along said given direction for reflecting said light flux, and
said portion of semiconductor material is located in the path of said given direction, the semiconductor material of said portion is the same as that of said region but has a greater electrical conductivity and a greater optical energy band gap than the semiconductor material of said region, and
one of said mirrors is adjacent said portion and being partially transmitting of said light flux.

8. A device for generating coherent radiation as described in claim 6, wherein
said means for establishing a resonant optical cavity in said body includes a metallic member adjacent to a surface of said region and disposed to reflect said coherent radiation in said given direction.

References Cited
UNITED STATES PATENTS

| | | | |
|---|---|---|---|
| 3,245,002 | 4/1966 | Hall | 331—94.5 |
| 3,248,669 | 4/1966 | Dumke | 331—94.5 |
| 3,265,990 | 8/1966 | Burns | 331—94.5 |

JEWELL H. PEDERSEN, *Primary Examiner.*

E. S. BAUER, *Assistant Examiner.*